(12) United States Patent
Miyawaki

(10) Patent No.: US 9,158,136 B2
(45) Date of Patent: Oct. 13, 2015

(54) DRIVING CIRCUIT FOR LIGHT MODULATOR

(71) Applicant: CANON KABUSHIKI KAISHA, Tokyo (JP)

(72) Inventor: Mamoru Miyawaki, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/085,651

(22) Filed: Nov. 20, 2013

(65) Prior Publication Data

US 2014/0198369 A1     Jul. 17, 2014

Related U.S. Application Data

(60) Provisional application No. 61/751,785, filed on Jan. 11, 2013.

(51) Int. Cl.
| | |
|---|---|
| *G02F 1/03* | (2006.01) |
| *G02F 1/01* | (2006.01) |
| *G02F 1/1362* | (2006.01) |
| *G09G 3/30* | (2006.01) |

(52) U.S. Cl.
CPC .......... *G02F 1/0121* (2013.01); *G02F 1/13624* (2013.01); *G09G 3/30* (2013.01); *G02F 2203/10* (2013.01)

(58) Field of Classification Search
CPC ......... G02F 1/00; G02F 1/0121; G02F 1/133; G02F 1/163

USPC .......... 359/245, 237, 264; 345/204, 205, 211, 345/206
See application file for complete search history.

(56) References Cited

U.S. PATENT DOCUMENTS 7,088,325 B2 * 8/2006 Ishii ................................ 345/89
8,519,945 B2 * 8/2013 Hagood et al. ................ 345/109

FOREIGN PATENT DOCUMENTS

| JP | 2006-330105 A | 12/2006 |
| WO | 2012/173071 A1 | 12/2012 |

* cited by examiner

*Primary Examiner* — Tuyen Tra
(74) *Attorney, Agent, or Firm* — Canon USA, Inc. I.P. Division

(57) ABSTRACT

A driving circuit for driving a light modulator including a matrix of pixels, the driving circuit includes, a first selecting unit configured to select a row of the matrix of pixels, each pixel having a capacitance element for modulating light; a first transistor configured to reset a voltage of the capacitance element in the selected row; a second selecting unit configured to select a column of the matrix of pixels, information being written in the capacitance element specified by the first and second selecting unit; and a second transistor, the information being written in the capacitance element through the second transistor.

20 Claims, 12 Drawing Sheets

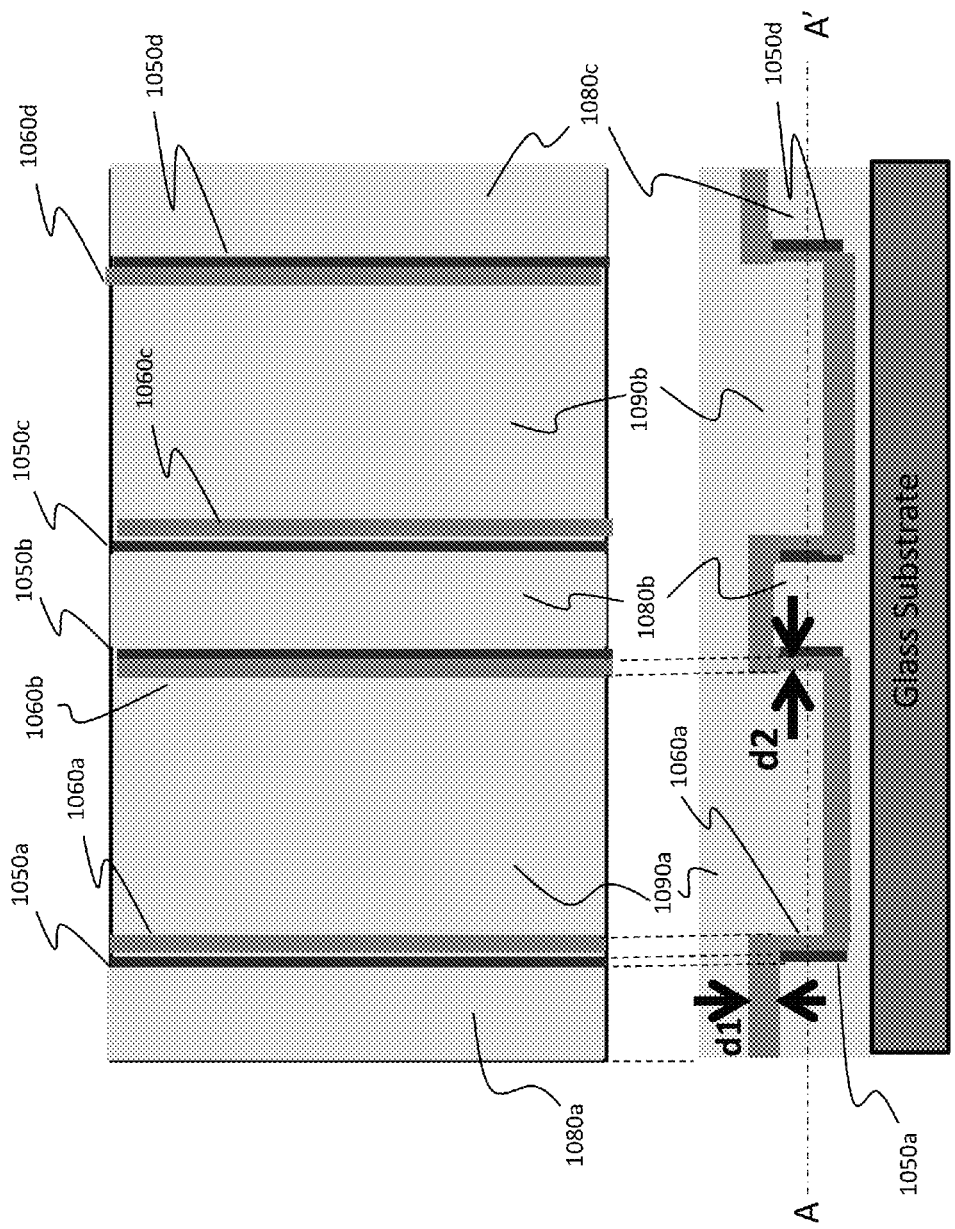

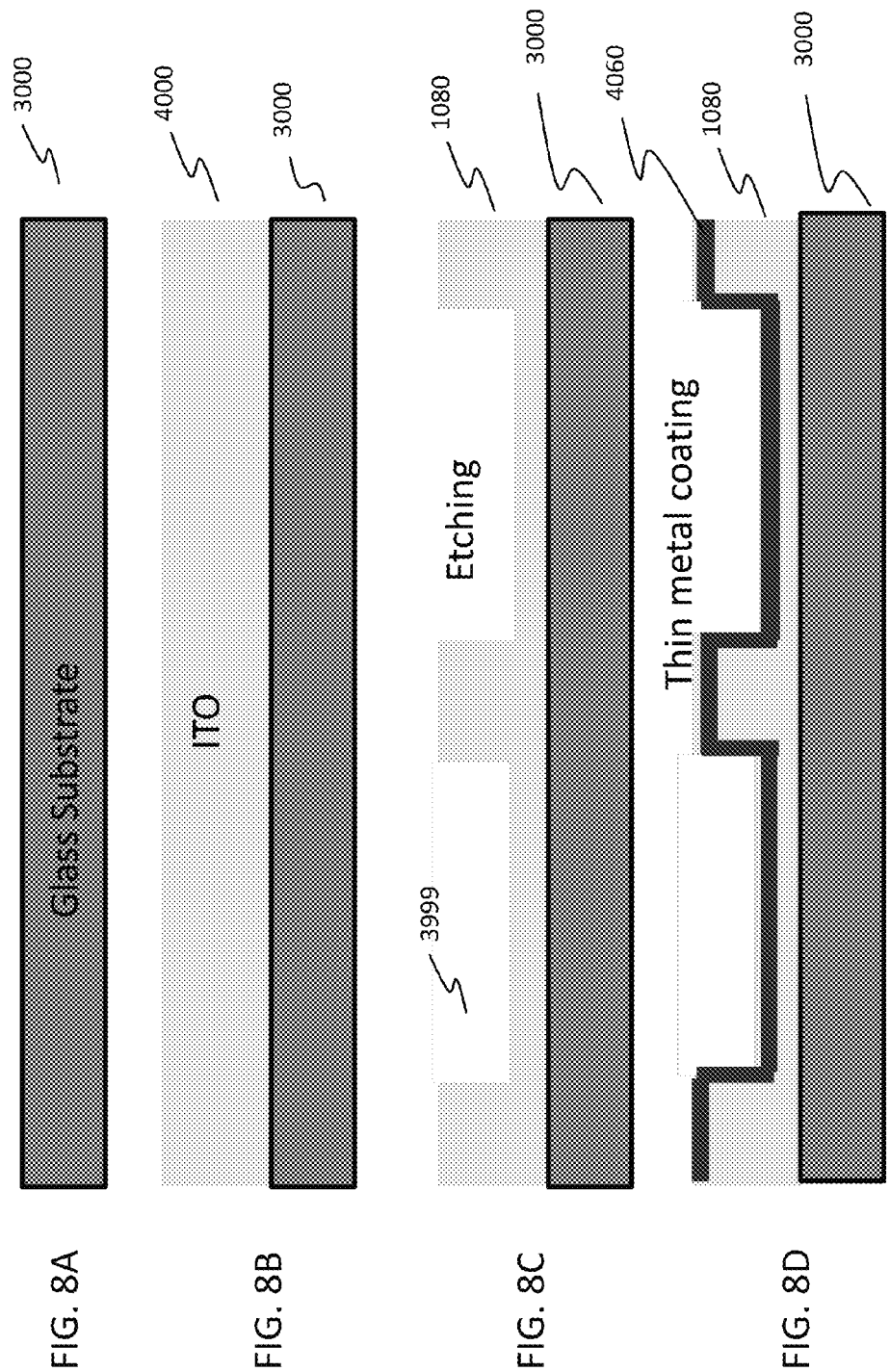

DRIVING CIRCUIT FOR LIGHT MODULATOR

CROSS REFERENCE TO RELATED APPLICATIONS

This application claims priority to U.S. provisional application No. 61/751,785 filed Jan. 11, 2013 entitled "NEW PLASMONIC MATERIALS IN VISIBLE SPECTRUM THROUGH ELECTRICAL CHARGING," the entire contents of which are hereby incorporated by reference.

BACKGROUND

1. Field of the Disclosure

An aspect of the present disclosure is related to a driving circuit for a spatial light modulator.

2. Description of the Related Art

A spatial light modulator using surface plasmon resonance is being developed. Since the surface plasmon resonance is occurred in metal material, we may see a high capacitance, which can cause delay, due to the metal material when it is used.

SUMMARY

Embodiments of the present disclosure provide a new driving circuit for a light modulator.

According to an aspect of the present disclosure, it is provided that a driving circuit for driving a light modulator including a matrix of pixels, the driving circuit includes, a first selecting unit configured to select a row of the matrix of pixels, each pixel having a capacitance element for modulating light; a first transistor configured to reset a voltage of the capacitance element in the selected row; a second selecting unit configured to select a column of the matrix of pixels, information being written in the capacitance element specified by the first and second selecting unit; and a second transistor, the information being written in the capacitance element through the second transistor.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B are associated with FIGS. 6A and 6B.

FIGS. 8A, 8B, 8C, 8D, 8E, 8F, and 8G illustrate a method for providing the light modulator.

DESCRIPTION OF THE EMBODIMENTS

Embodiments according to the present invention will be described below with references to the attached drawings.

As one example of the light modulator, a transmitted light control device, which is possible to control a peak wavelength and a peak intensity of the transmitted light, is disclosed in International Patent Publication No. WO 2012/173071 published on Dec. 20, 2012.

Figure 10:
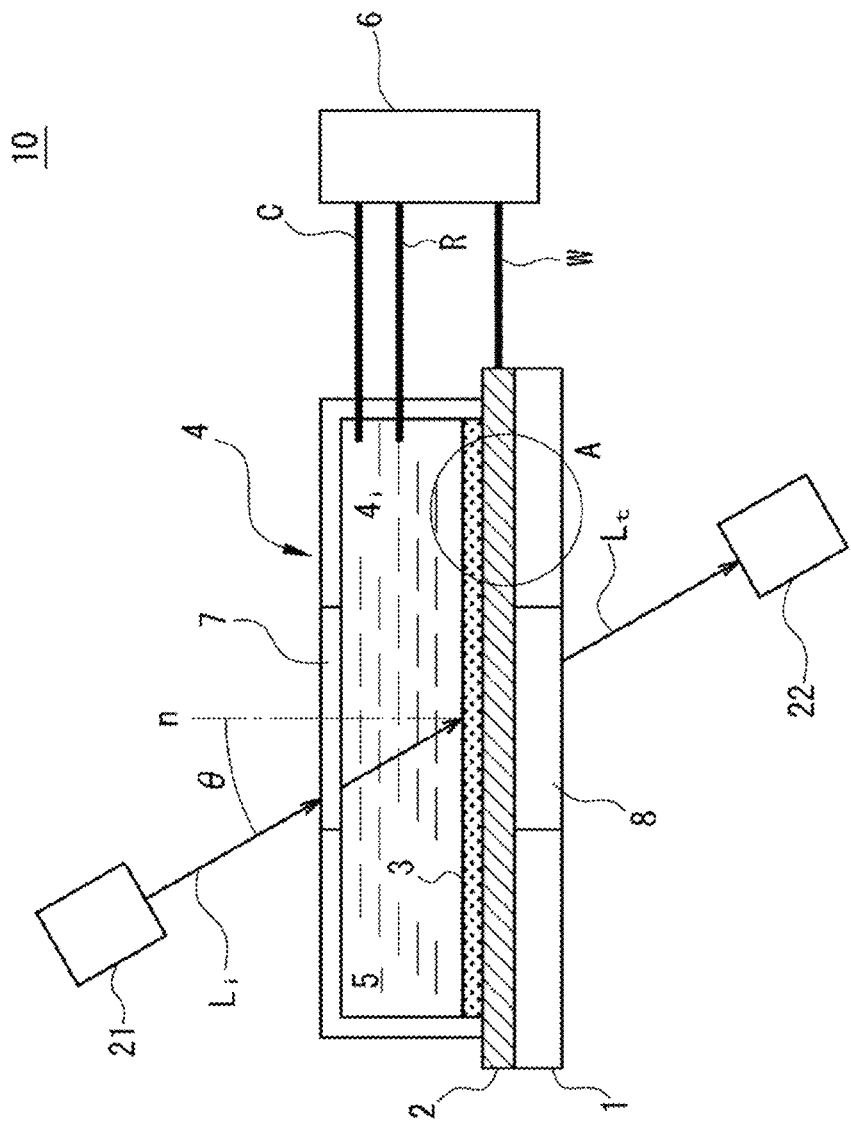
FIG. 10 illustrates a transmitted device excerpted from International Patent Publication No. WO 2012/173071.

The transmitted light control device 10 includes a metal thin film 2, a conductive macromolecule layer 3 on the film 2, and a metal film potential control means 6 as described in FIG. 10. By changing the potential of the metal film 2, the control means 6 changes the complex dielectric constant of the conductive macromolecular layer 3 and controls light which has passed through the conductive macromolecule layer. In FIG. 10, a substrate 1, an electrochemical cell 4, a liquid medium 5, a photo receiving portion 7, a photo exiting portion 8, a light source 21, a light detector 22, a counter electrode (C), a reference electrode (R), and a working electrode are illustrated.

When a spatial light modulator which has a matrix of pixels and each pixel includes the transmitted device explained above, each pixel may have a high capacitance element due to the metal film and the conductive macromolecule layer.

A driving method for treating such high capacitance element is explained below. As a first embodiment, an equivalent circuit for analog input system is described in FIG. 1.

Each pixel 5000 is defined by a first circuit 5010 (e.g., a horizontal shift circuit or H Shift register), and a second circuit 5020 (e.g., a vertical shift circuit or V Shift Register).

The high capacitance element 5090 is placed in each pixel 5000.

The first circuit 5010 which can select a column to write an analog signal. The second circuit 5020 which can select a row to write the signal. The analog signal is sent by an analog signal driver 5150 through an analog signal line 5030.

A horizontal gate line 5040 is connected to a gate of a transistor 5110 for each pixel 5000. A horizontal gate line 5050 is connected to a gate of a reset transistor 5130 for each pixel 5000. The source of the transistor 5130 is grounded by an earth 5080.

Figure 1:
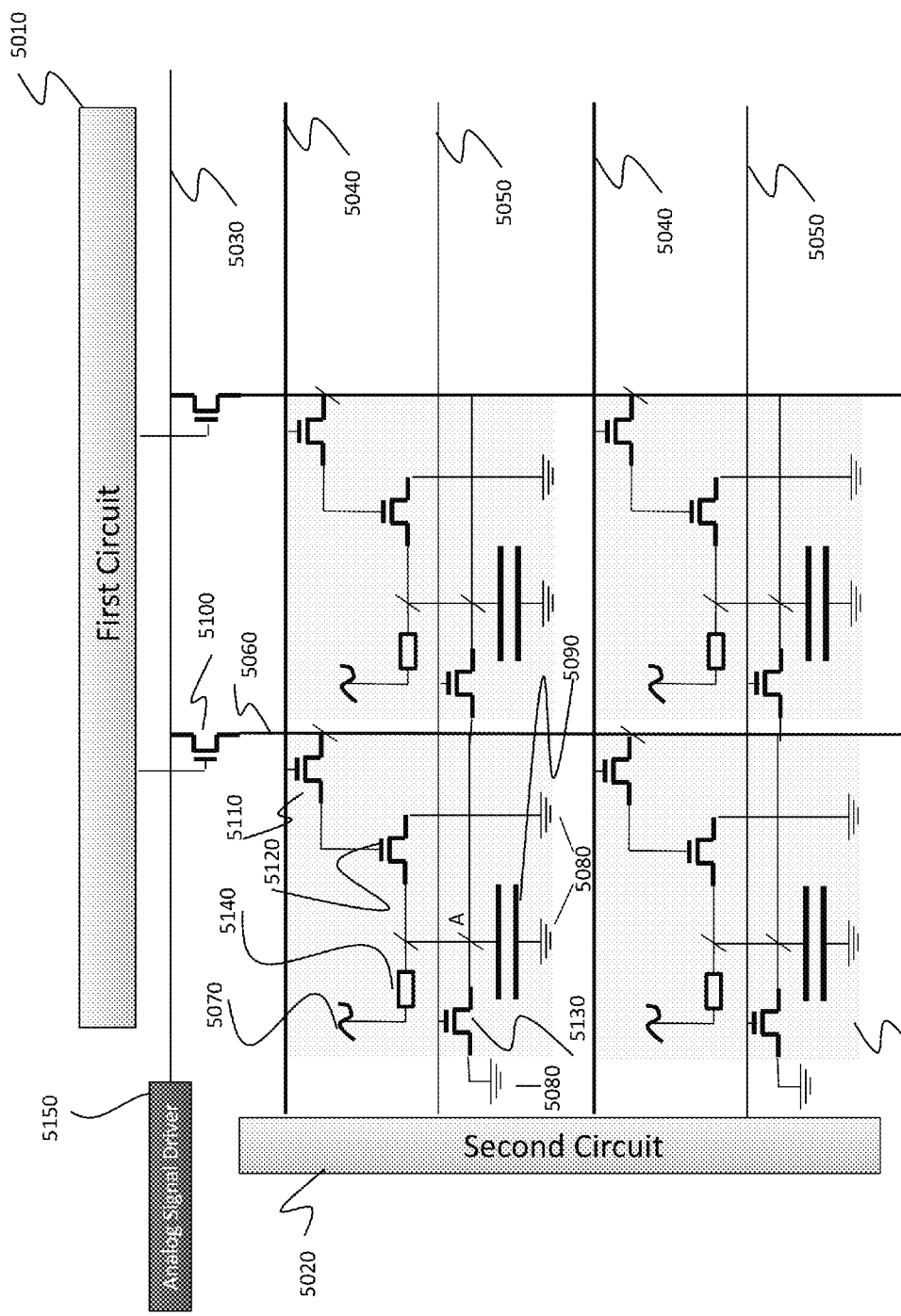
FIG. 1 illustrates a driving circuit of a first embodiment.

A vertical line 5060 connected to the drain of the transistor 5100 is also connected to the transistor 5110 as described in FIG. 1.

A transistor 5120, which is a FET (Field-Effect Transistor), is used as a source follower amplifier. A resistance 5140 is used as the load for the source follower amplifier. A voltage source 5070 is connected to the resistance 5140. A transistor 5130 to reset the voltage of the high capacitance element 5090 is used. The drain of transistor 5130 and a source of the transistor 5120 are reset to a ground level by using the earth 5080.

A driving method for treating the high capacitance method is described.

Step 1: Reset Operation

Figure 2:
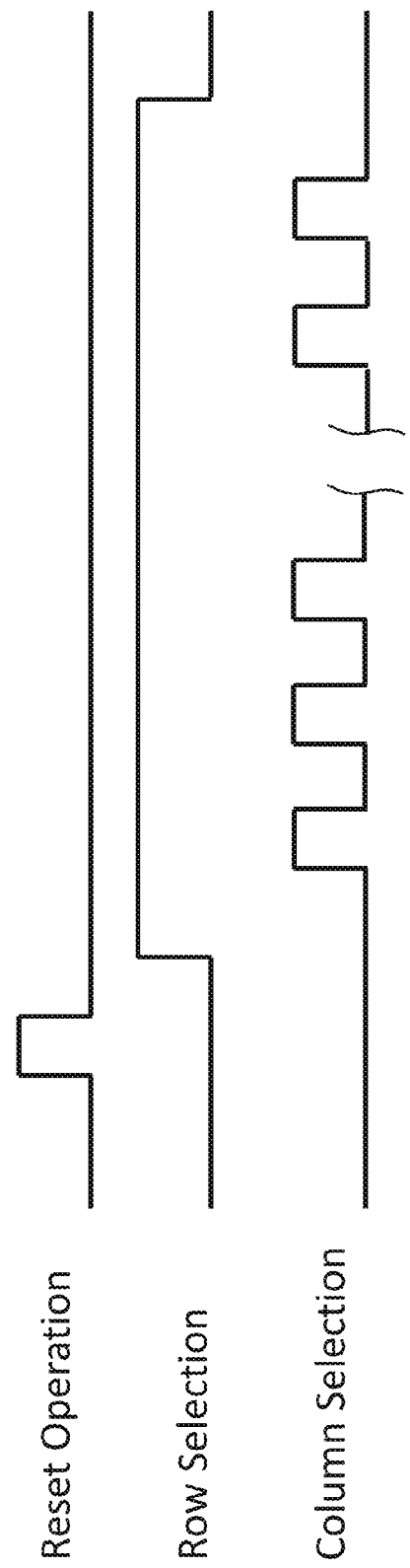
FIG. 2 illustrates a timing chart.

Before writing the signal to each capacitance 5090 per pixel, the voltage of the capacitance 5090 in a row selected by the second circuit 5020 will be reset by the reset operation as described in FIG. 2. The reset operation can be executed for each row, or executed by all or a plurality of the rows at the same time. When the line 5050 is high due to the second circuit 5020, the transistor 5130 as a reset transistor is ON, and the voltage of a portion at a denoted as A in FIG. 1 becomes 0 (V).

Step 2: Writing Operation

After the line 5050 becomes low by the second circuit 5020, the line 5040 becomes ON by the second circuit 5020. It means that a row for the writing is selected as described in a timing chart of FIG. 2, and then the column will be selected by the first circuit 5010 sequentially as described in the timing chart of FIG. 2. When the transistor 5100 is ON, the analog signal goes through the transistor 5110 and charges up the gate of transistor 5120 in proportion to the above analog signal. The voltage at node A increases in proportion to the input analog signal from the analog signal driver 5150. Since a capacitance of the gate of the transistor 5120 can be set to be smaller than that of the capacitance 5090, even if the capacitance element 5090 is too large to write the signal under the X-Y matrix based circuit, it's easy to write the analog signal to the high capacitance element 5090. In short, information from the analog signal driver 5150 is written in the high capacitance indirectly through the transistor 5120. After the writing operation, the transistor 5100 will be turned off. The signal can be written to each pixel one by one.

Figure 3:
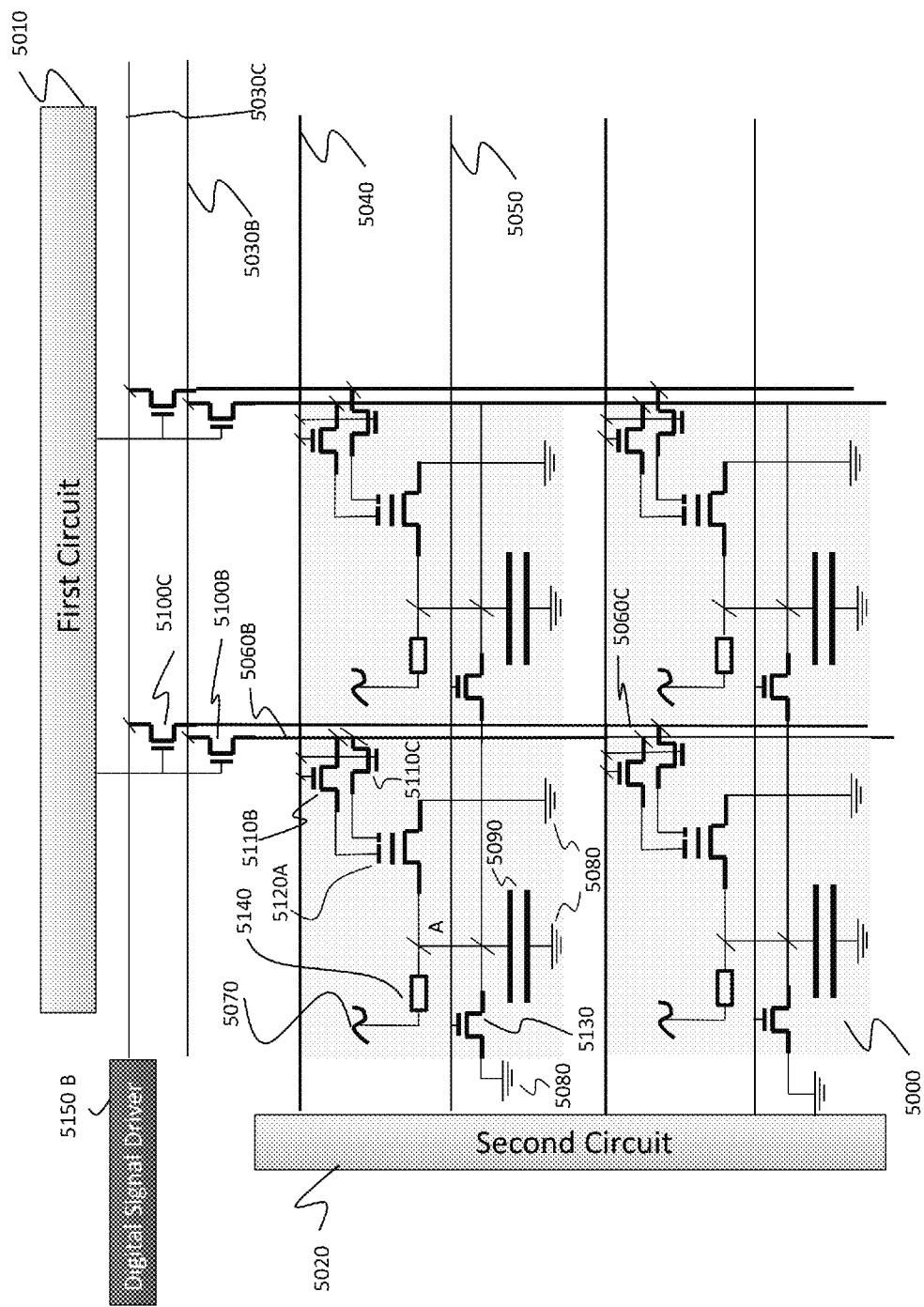
FIG. 3 illustrates a driving circuit of a second embodiment.

As a second embodiment, an equivalent circuit for a digital input system is described in FIG. 3.

A first circuit 5010 (e.g., horizontal shift register) selects a column to be written by a digital signal. A second circuit 5020 (e.g., vertical shift register) which selects a row to be written by the signal. In this embodiment, a multi-gate capacitive coupling MOSFET (metal-oxide-semiconductor field-effect transistor) transistor 5120A for a source follower amplifier is used.

A vertical line 5030B is for writing a digital signal of the $2^{nd}$ bit. A vertical line 5030C is for writing a digital signal of the $1^{st}$ bit. A horizontal gate line 5040 is connected with a transistor 5110B for a $2^{nd}$ bit selection and a transistor 5110C for $1^{st}$ bit one.

A horizontal gate line 5050 is connected with the reset transistor 5130 for each pixel 5000. A vertical line 5060B is used for the $2^{nd}$ bit digital input signal. A vertical line 5060C is used for the $1^{st}$ bit digital input signal. A voltage source 5070 and an earth 5080 for the grounding are used. Each pixel 5000 has a capacitance element 5090.

A transistor 5100B is used for selecting the vertical line for the $2^{nd}$ bit of digital input signal through the line 5030B. A transistor 5100C is used for selecting the vertical line for the $1^{st}$ bit of the digital input signal through the line 5030C. A transistor 5110B is used for selecting the row for the $2^{nd}$ bit of the digital input signal. A transistor 5110C is for selecting the row for the $1^{st}$ bit of the digital input signal. A multi-gate capacitive coupling MOSFET transistor 5120A is used for the source follower amplifier. A transistor 5130 to reset the voltage of the capacitance element 5090 is used as well as the first embodiment. A resistance 5140 is for the source follower amplifier. A digital signal is sent by a digital signal driver 5150B.

Another driving method for treating the high capacitance element is described below.

Step 1: Reset Operation

Before writing the signal to each capacitance element 5090 per pixel, the voltage of the capacitance element 5090 in the row selected by the second circuit 5020 will be reset. The reset operation can be executed for each row, or executed by all or plurality of the rows at the same time. When the line 5050 is high by the second circuit 5020, the transistor 5130 as the reset transistor becomes ON, and the voltage of the node A becomes 0V.

Step 2: Writing Operation

After the line 5050 is low by the second circuit 5020, the line 5040 becomes ON by the second circuit 5020 to select the writing row. Then, the column is selected by the first circuit 5010 sequentially. When the transistor 5100B and 5100C are ON, the digital signal goes through the transistor 5110B and 5110C respectively and charges up the gate of transistor 5120A in proportion to the above digital signal. The voltage at node A increases in proportion to the input digital signal. Since the gate capacitance of the transistor 5120A is smaller than that of the capacitance element 5090, even if the capacitance element 5090 is too large to write the signal under the X-Y matrix based circuit, it's easy to write the analog signal in the high capacitance element 5090. After the writing operation, the transistor 5100B and 5100C will be turned off. The signal can be written to each pixel one by one.

In the second embodiment, the multi-gate capacitive coupling transistor 5120A has two gates for the $1^{st}$ and $2^{nd}$ bit signals, but the number of the gate can be increased.

Figure 4:
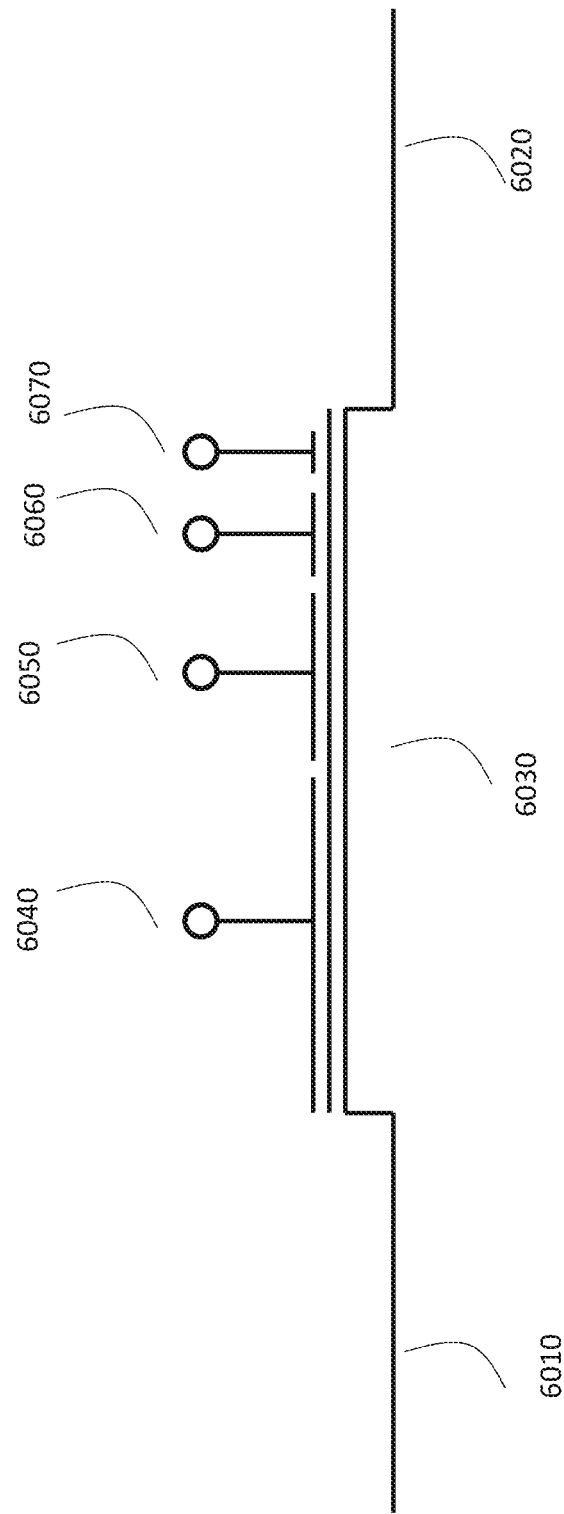
FIG. 4 illustrates a multi-gate capacitive coupling MOS-FET.

In FIG. 4, the schematic structure of the Multi-Gate Capacitive coupling MOSFET for 4 bit is explained as the example. A source, drain, and channel are denoted as 6010, 6020, and 6030, respectively. The difference against a conventional MOSFET is to implement the multi-gate through the capacitive coupling to the gate.

The $4^{th}$ bit, $3^{rd}$ bit, $2^{nd}$ bit, and $1^{st}$ bit are corresponding to the gates 6040, 6050, 6060, and 6070, respectively. The area of the $2^{nd}$ bit gate 6060 is twice than that of the $1^{st}$ bit gate 6070. The area of the $3^{rd}$ bit gate 6050 is twice that of the $2^{nd}$ bit gate 6060. The area of the $4^{th}$ bit gate 6040 is twice than that of the $3^{rd}$ bit gate 6050.

A potential applied to the channel 6030 can be controlled by the combination of each pulse of multi-gate. In order to induce the maximum voltage to the channel, the pulse of 6040, 6050, 6060, and 6070 should be high. In order to induce the half of the maximum voltage to the channel, the pulse of 6040, 6050, 6060, and 6070 should be high, low, low, and low, respectively. In order to induce 75% of the maximum voltage to the channel, the pulse of 6040, 6050, 6060, and 6070 should be high, high, low, and low, respectively. It means that the digital input data can be converted to analog input data by the capacitive coupling in the gate of the above transistor that plays a role of the source follow amplifier.

(Light Modulator)

The high capacitance element for the light modulator is exemplary described below.

An in-plane permittivity of a metal thin film can be different from an out-of-plane permittivity of the metal when the thickness of the metal is several nanometers (e.g., 5-7 nm). An anisotropic permittivity of the film can be seen due to the thickness. This phenomenon can be explained by what is referred to as a thin-film (or size) effect. This effect can occur depending on the thickness of the metal film. When the thickness of the metal film is about 50 nm, we cannot see the anisotropic permittivity of the metal film, and the characteristic of the permittivity of the metal film becomes the one of a bulk metal.

Both the in-plane permittivity and the out-of-plane permittivity can vary according to the thickness of the metal film, and especially the imaginary part, related to light absorption, of the out-of-plane permittivity increases sharply beyond comparison. In other words, a strong absorption of light can be seen due to the thickness of the metal film.

Even though the thickness of the metal film is not several nanometers and the characteristic of it looks like a bulk material, we can see the anisotropic permittivity of the film when an electric field is locally applied to the surface of the metal film. It may be understood that the localized electric field can restrict the movement of the electron of the surface of the thin film.

An optical device may be provided that can selectively modulate a specified wavelength of light that comprises a wide range of wavelengths.

Figure 5:
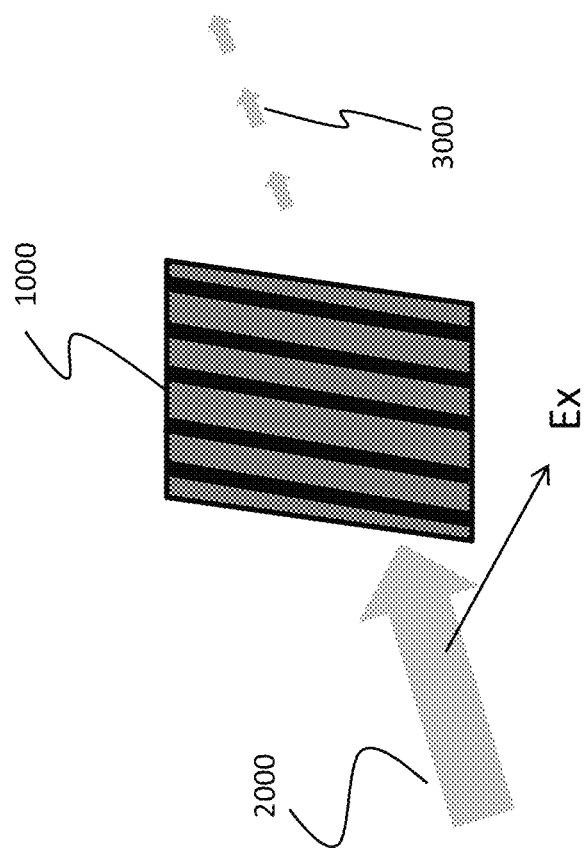
FIG. 5 illustrates a light modulator and a characteristic thereof.

FIG. 5 illustrates a light modulator 1000, and modulated light 3000 with a specified wavelength of an incident light 2000 that can pass through the light modulator 1000. The incident light 2000 is composed of a wide range of wavelengths of light, and the light propagates in a z-direction. $E_x$ denotes an element of the incident light 2000 and the direction of $E_x$ is perpendicular to the z-direction. A polarizer (not shown) can obtain a polarized light. The light modulator 1000 can control the transmitted wavelength of the incident light 2000 by using a voltage applied to the light modulator 1000.

Figure 6A:
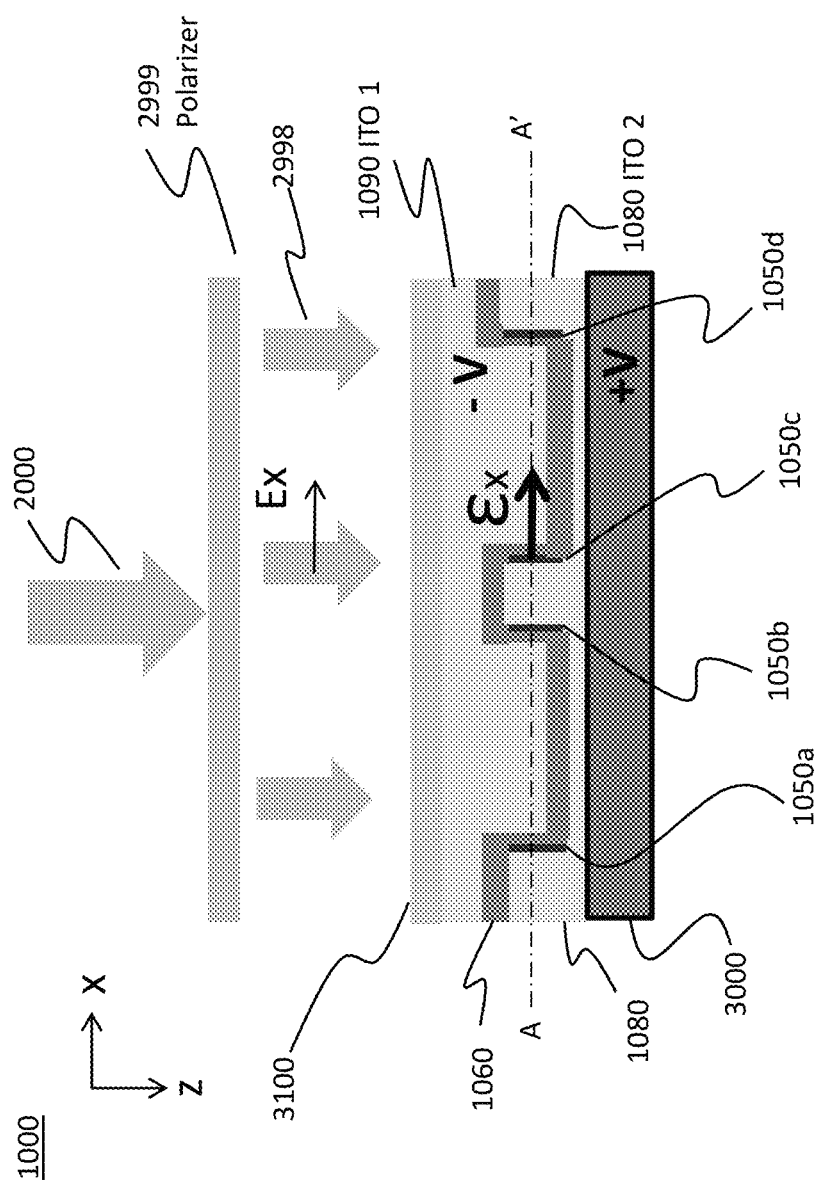
FIG. 6A illustrates a cross sectional view of a light modulator.

A cross sectional view of an element of the light modulator 1000 is illustrated in FIG. 6A. Each pixel can include the element of the light modulator. The incident light is a polarized light 2998 composed of an element $E_x$ which can be obtained by a polarizer 2999. The light modulator 1000 comprises a band pass filter 3100 for selecting the light having a specific wavelength, a first transparent layer 1090 (e.g., ITO (Indium Tin Oxide), a dielectric layer 1060, a thin metal film 1050a (1050b, 1050c, 1050d), a second transparent layer 1080 (e.g., ITO), and a substrate 3000. Light with a selected wavelength can pass through the band pass filter 3100.

Since the polarized light 2998 impinges on the light modulator 1000, permittivity of the surface of the thin metal film 1050a (1050b, 1050c, 1050d) can be regarded as $\in_x$. An interval between the thin metal films 1050a and 1050b can be set at a length which is at, around, near, or less than the wavelength of the incident light 2998 to cause an interaction between the light and the thin metal film. If a visible light is used as the incident light, the interval may be set at a range from 80 nm to 100 nm, for example. Therefore, when the light passing through the thin metal film 1050, the light can be affected by the thin metal film 1050, when the incident light 2998 has a wavelength that is at, around, near, or less than the interval between the thin metal films 1050a and 1050b.

The bias voltage can be applied to the thin metal film 1050 by the first and second transparent layers (electrodes) 1080, and 1090. The thickness of the thin metal film 1050 can be set at 10 nm, for example.

During no bias state, the light 2998 can go through the light modulator 1000 because the thin metal film 1050 with the 10 nm thickness may have a characteristic of a bulk, and the imaginary part of the permittivity $\in_x$ is small and the above described strong absorption doesn't occur. The light 2998 can pass through the light modulator 1000 with a transmitted light amount which substantially similar to an amount of the incident light.

On the other hand, when a negative voltage (e.g., −1 V) is applied to the first transparent layer (via a first electrode) 1090 and a plus voltage (e.g., 0 V) is applied to the second transparent layer (via a second electrode) 1080, the transmitted amount of the light 2998 can be decreased. Because a side surface part of the dielectric layer 1060 adjacent to the first transparent layer (first electrode) 1090 becomes positive and the other side surface part of the dielectric layer 1090 becomes negative and the electrons of the surface of the thin metal film 1050 can be driven away to the inside of the thin metal film 1050. In short, an effective thickness of the thin metal film 1050 for the movement of the electron can be decreased. Therefore, the imaginary part of the permittivity $\in_x$, which is an element of permittivity in the x-direction, will be increased sharply and the anisotropic permittivity will occur. The light 2998 can be absorbed, and the amount of the transmitted light decreases. Depending on the magnitude of the bias, the amount of the transmitted light may become zero. By using an applied voltage, the intensity of light which pass through the light modulator 1000 can be controlled.

When a frequency of the light 2998 is close to a frequency of the surface plasmon excited on the surface of the thin film 1050, an absorption wavelength due to the surface plasmon may match with the frequency of the light 2998. When the absorption wavelength matches with the frequency of the light 2998, a zero transmitted amount of light may be caused, and when the absorption wavelength doesn't match with the frequency of the light 2998, a non-zero transmitted amount of light may be caused. Therefore, the S/N (Signal/Noise) ratio can be increased.

As illustrated in FIG. 5, the light modulator has the first and second transparent layers (1080, 1090), and each transparent layer can be connected with an electrode to apply the voltage. The first transparent layer 1090 is contacted with the thin metal film which is adjacent to the second transparent layer 1080 through the dielectric layer 1060.

As illustrated in FIG. 6A, the polarizer 2999 can cause the polarized light 2998 which is polarized to an x-direction. A part of the incident light 2000 with the wide range of the wavelength can be removed by the band pass filter 3000 so that light with a specified wavelength can go through the light modulator 1000.

Figure 6B:
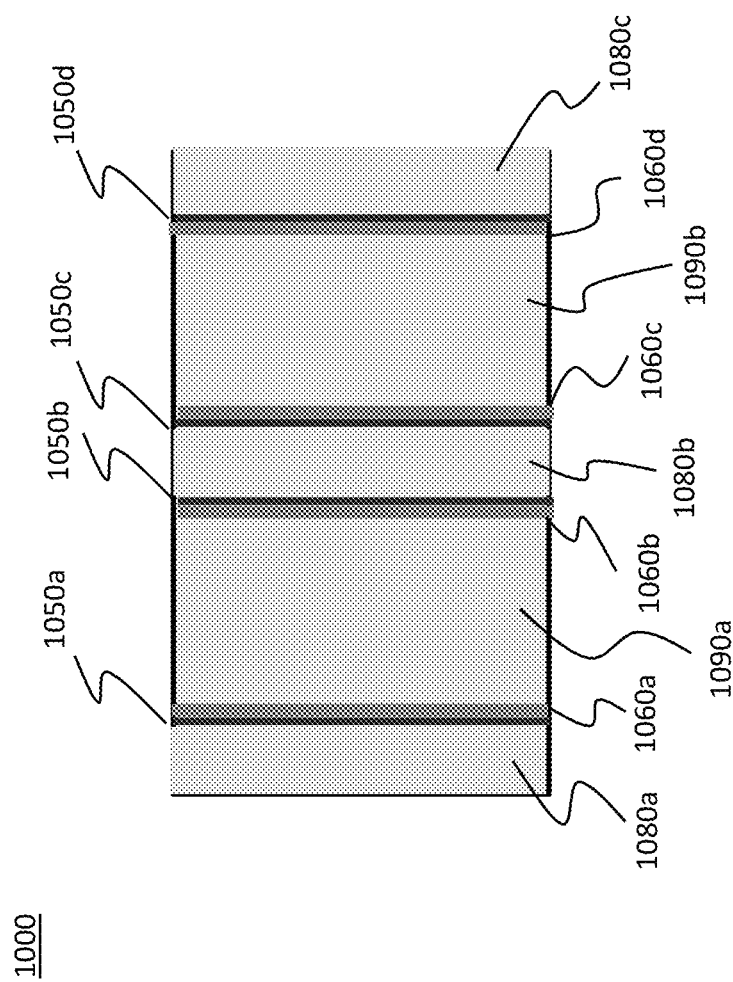
FIG. 6B illustrates a cross sectional view of the light modulator obtained by a cutting plane AA'.

A cross sectional view of the light modulator 1000 obtained by a cutting plane AA' is illustrated in FIG. 6B. Material of the thin film 1050a (1050b, 1050c, 1050d) may be Au (gold), Ag (silver), or an alloy.

A thickness of the first (second) transparent layer 1090 (1080) may be selected from a range between 0.01 µm and 1 µm. The thickness of the thin film 1050 in x-direction is about 10 nm. A cross sectional view of the light modulator 1000 obtained by a cutting plane AA' of FIG. 7B is illustrated in FIG. 7A. The thickness d2 of the dielectric layer 1060 in FIG. 7B may be selected from a range between 5 nm and 50 nm. The thickness d1 of the dielectric layer 1060 in FIG. 7B may be selected from a range between 100 nm and 5000 nm. When there is a great difference between d1 and d2, an electric field may be locally applied to a thinner portion of the dielectric layer 1060. For example, when the thickness d1 is about 10 times or more larger than the thickness d2, the applied electric field can be localized to the dielectric layer with the thickness d2. The dielectric layer 1060 may be $SiO_2$, or SiN. The interval between the thin metal films 1050a and 1050b can be selected, for example, from a range between 80 and 100 nm so that the light can interact with the thin metal film 1050.

Figure 8E:
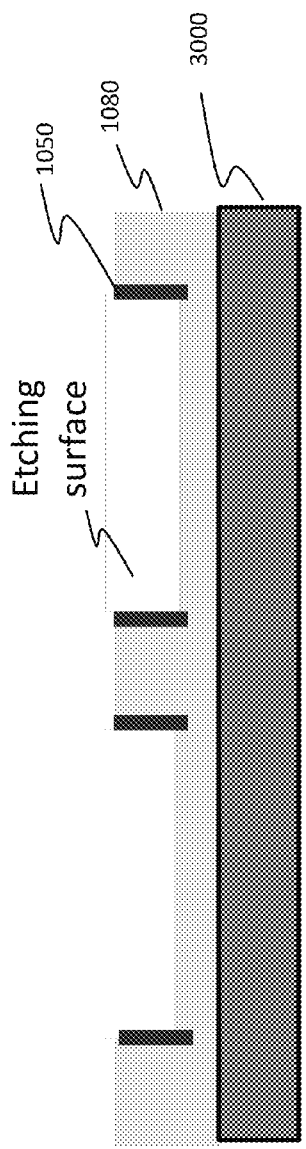

A method for providing the light modulator 1000 is illustrated by FIGS. 8A through 8G. For example, a glass substrate 3000 is prepared as illustrated in FIG. 8A. The ITO layer 4000 as the second transparent layer is formed on the glass substrate 3000 by spattering as illustrated in FIG. 8B. To form a trench on the ITO layer 4000, a reactive ion etching (RIE) can be executed as illustrated in FIG. 8C. The formed ITO layer 1080 with a trench structure 3999 is obtained. By a CVD (Chemical Vapor Deposition) method or a plasma-assisted spattering method, a thin Au film 4060 can be formed on the ITO layer 1080 as illustrated in FIG. 8D.

By using the CVD method, a surface of the Au film 4060 will be covered by a protective layer of $SiO_2$ or resist. And then, the protective layer and Au layer of the top surface of the ITO layer 1080 will be removed by an anisotropic etching mode of the RIE. After the removal of them, the remained protective layer can be removed as illustrated in FIG. 8E.

Figure 8F:
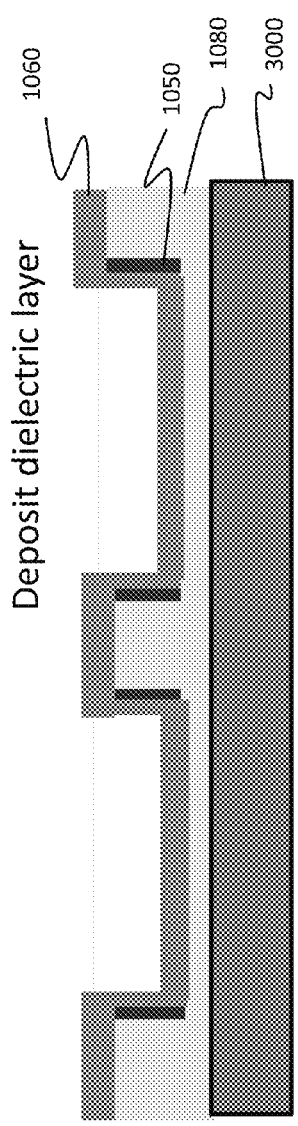
Figure 8G:
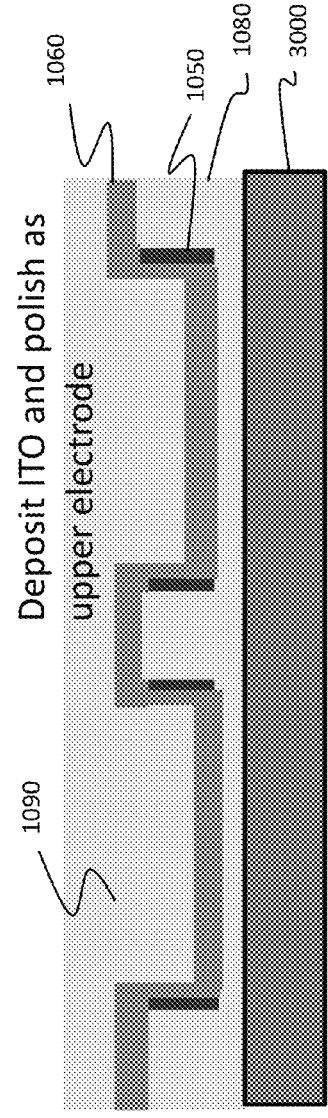

As illustrated in FIG. 8F, a dielectric layer 1060 of SiO2 or SiN can be formed, and then another ITO layer 1090 as the first transparent layer can be formed thereon by spattering. As necessary, after the spattering, the surface of the top layer can be polished to be leveled by CMP (chemical mechanical polishing). Each ITO layer can be connected to an electrode to apply a voltage.

Figure 9:
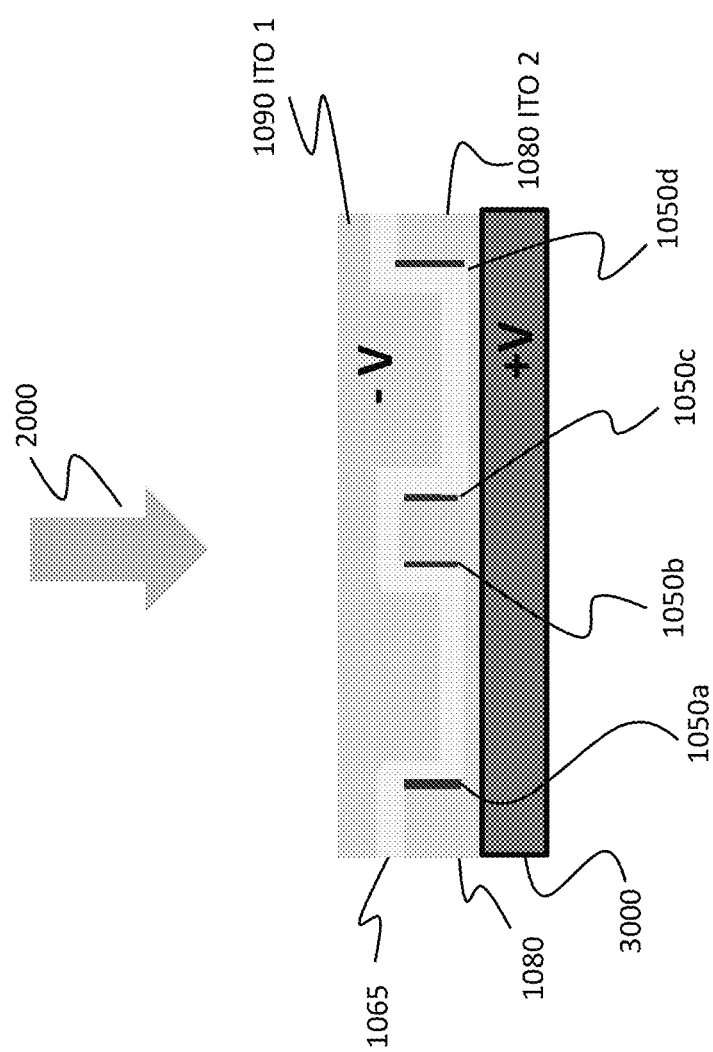
FIG. 9 illustrates a cross sectional view of a light modulator.

A cross sectional view of another high capacitance device for modulating light is described in FIG. 9.

An Ionic conductor 1065 instead of the dielectric material of FIG. 6A can be used for forming the light modulator as illustrated in FIG. 9. For example, Na—Ca-Phosphosilicate, Rb—Ag—I, and Li—Mn—O can be used as the ionic conductor 1065.

The bias voltage can be applied to the thin metal film 1050a (b, c, d) by the first and second transparent layers (electrodes) 1080, and 1090. The E-field in this case can be larger than that of dielectric material because ion can be closer to the metal surface.

The present disclosure for the driving circuit can be used for not only the described light modulator, but also any light modulators with a high capacitance.

While the embodiments according to the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. A driving circuit for driving a light modulator including a matrix of pixels, the driving circuit comprising:
   a first selecting unit configured to select a row of the matrix of pixels, each pixel having a capacitance element for modulating light;
   a first transistor configured to reset a voltage of the capacitance element in the selected row;
   a second selecting unit configured to select a column of the matrix of pixels, information being written in the capacitance element specified by the first and second selecting unit; and
   a second transistor, the information being written in the capacitance element through the second transistor,
   wherein the first transistor is grounded and connected with the capacitance element.

2. The driving circuit according to claim 1, further comprising a voltage source and a resistance connected with the voltage source.

3. The driving circuit according to claim 1, wherein the first selecting unit selects a plurality of rows of the matrix at the same time.

4. The driving circuit according to claim 1, further comprising a third transistor to select a row for a writing operation.

5. The driving circuit according to claim 1, wherein the light modulator comprises a metal film.

6. The driving circuit according to claim 1, wherein the second transistor is a multi-gate capacitive coupling MOSFET.

7. The driving circuit according to claim 1, wherein the capacitance element for modulating light comprises:
   a first conductive layer;
   a second conductive layer;
   a dielectric layer provided between the first conductive layer and the second conductive layer;
   a first film between the first conductive layer and the dielectric layer;
   a second film between the first conductive layer and the dielectric layer, wherein the second film is located at a first interval from the first film;
   wherein, when a bias voltage is applied to the capacitance element, the capacitance element absorbs light with a wavelength for the modulating.

8. A driving circuit for driving a light modulator including a matrix of pixels, the driving circuit comprising:
   a first selecting unit configured to select a row of the matrix of pixels, each pixel having a capacitance element for modulating light;
   a first transistor configured to reset a voltage of the capacitance element in the selected row;
   a second selecting unit configured to select a column of the matrix of pixels, information being written in the capacitance element specified by the first and second selecting unit;
   a second transistor, the information being written in the capacitance element through the second transistor; and
   a third transistor to select a row for a writing operation.

9. The driving circuit according to claim 8, further comprising a voltage source and a resistance connected with the voltage source.

10. The driving circuit according to claim 8, wherein the second transistor is a multi-gate capacitive coupling MOSFET.

11. The driving circuit according to claim 8, wherein the capacitance element for modulating light comprises:
    a first conductive layer;
    a second conductive layer;
    a dielectric layer provided between the first conductive layer and the second conductive layer;
    a first film between the first conductive layer and the dielectric layer;
    a second film between the first conductive layer and the dielectric layer, wherein the second film is located at a first interval from the first film;
    wherein, when a bias voltage is applied to the capacitance element, the capacitance element absorbs light with a wavelength for the modulating.

12. A driving circuit for driving a light modulator including a matrix of pixels, the driving circuit comprising:
    a first selecting unit configured to select a row of the matrix of pixels, each pixel having a capacitance element for modulating light;
    a first transistor configured to reset a voltage of the capacitance element in the selected row;
    a second selecting unit configured to select a column of the matrix of pixels, information being written in the capacitance element specified by the first and second selecting unit;
    a second transistor, the information being written in the capacitance element through the second transistor; and
    wherein the capacitance element for modulating light comprises:
    a first conductive layer;
    a second conductive layer;
    a dielectric layer provided between the first conductive layer and the second conductive layer;
    a first film between the first conductive layer and the dielectric layer;
    a second film between the first conductive layer and the dielectric layer, wherein the second film is located at a first interval from the first film;
    wherein, when a bias voltage is applied to the capacitance element, the capacitance element absorbs light with a wavelength for the modulating.

13. The driving circuit according to claim 12, wherein the first and second film is made of metal.

14. The driving circuit according to claim 12, wherein the first and second films have a thickness that is less than the thickness of the dielectric layer.

15. The driving circuit according to claim 12, wherein the first and second conductive layer is a transparent conductor.

16. The driving circuit according to claim 12, further comprising a voltage source and a resistance connected with the voltage source.

17. The driving circuit according to claim 12, wherein the second transistor is a multi-gate capacitive coupling MOSFET.

18. A driving circuit for driving a light modulator including a matrix of pixels, the driving circuit comprising:
    a first selecting unit configured to select a row of the matrix of pixels, each pixel having a capacitance element for modulating light;
    a first transistor configured to reset a voltage of the capacitance element in the selected row;
    a second selecting unit configured to select a column of the matrix of pixels, information being written in the capacitance element specified by the first and second selecting unit;
    a second transistor, the information being written in the capacitance element through the second transistor;
    a voltage source; and
    a resistance connected with the voltage source,
        wherein the resistance is connected with the second transistor to form a source follower amplifier.

19. The driving circuit according to claim 18, wherein the information is written in a gate of the second transistor so that the information is written in the capacitance element indirectly by using the source follower amplifier.

20. A driving circuit for driving a light modulator including a matrix of pixels, the driving circuit comprising:
    a first selecting unit configured to select a row of the matrix of pixels, each pixel having a capacitance element for modulating light;
    a first transistor configured to reset a voltage of the capacitance element in the selected row;
    a second selecting unit configured to select a column of the matrix of pixels, information being written in the capacitance element specified by the first and second selecting unit; and
    a second transistor, the information being written in the capacitance element through the second transistor,
    wherein the second transistor is a multi-gate capacitive coupling MOSFET.

* * * * *